United States Patent [19]

Janszen

[11] Patent Number: 4,919,602
[45] Date of Patent: Apr. 24, 1990

[54] APPARATUS FOR REPAIRING WINDSHIELDS

[76] Inventor: Arthur W. Janszen, 9730 Grenadier, Houston, Tex. 77089

[21] Appl. No.: 316,654

[22] Filed: Feb. 28, 1989

Related U.S. Application Data

[63] Continuation-in-part of Ser. No. 135,585, Dec. 21, 1987, abandoned.

[51] Int. Cl.$^5$ .................... B29C 31/04; B29C 73/24; B32B 35/00
[52] U.S. Cl. ........................................ 425/12; 156/94; 264/36; 425/13
[58] Field of Search .............. 156/94; 264/36; 425/12, 425/13

[56] References Cited

U.S. PATENT DOCUMENTS 4,681,520 7/1987 Birkhauser ........................... 425/12

*Primary Examiner*—Robert A. Dawson
*Attorney, Agent, or Firm*—Al Harrison; John S. Egbert

[57] ABSTRACT

Means and methods are provided for the in situ repair with liquid resin of shatterproof windshields and the like. An apparatus is provided which is composed of a plate disposed at the top portion of a preferably rectangular housing which supports a novel injector assembly and pressure assembly. The support plate is pivotally interconnected to the top portion of the housing preferably by a pair of hinges disposed on each of the housing's longitudinal sides. The housing is secured to the surface of the windshield by a vacuum created by the action of a membrane-handlebar assembly. The injector assembly is disposed perpendicularly of and axially through one of a plurality of ear-like apertures. The apparatus is adapted to enable convenient adjustments to the pitch and elevation of the injector assembly with respect to the surface damage, accordingly provide a means and method to maintain the requisite pressures upon the liquid resin as it is transported through the injector assembly to the seal-damage interface. The holding power of the injector assembly derives from the leverage action inherent in the concept of the present invention.

28 Claims, 8 Drawing Sheets

APPARATUS FOR REPAIRING WINDSHIELDS

RELATED APPLICATIONS

The present application is a continuation-in-part of U.S. patent application serial No. 135,585, filed Dec. 21 1987, entitled "Apparatus of Glass Repairs." This said application is now abandoned.

FIELD OF THE INVENTION

The present invention relates to methods and apparatus for repairing glass and more particularly relates to improved techniques for in situ repairing of shatterproof windshields and the like.

BACKGROUND OF THE INVENTION

When glass, and more particularly, a windshield is struck by an object or projectile, such as a rock, the outer glass pane is likely to be damaged. As is well known in the prior art, a shatterproof windshield is composed of an intermediate plastic laminate which bonds an outer glass pane and an inner glass pane together. This combination of glass-plastic laminations absorbs the forces of impact, thereby reducing the extent of the damage to the windshield.

Upon impact, glass on the surface of a windshield fractures into a simple crack, or a cone-like formation with damage directed radially therefrom in several directions. When a cone is formed, it normally has a peak on the surface which is often exposed to the atmosphere. The base of the cone typically extends to the bottom of the outer glass pane adjacent the plastic laminate. The sides of this cone, as well as any related fractures that may have formed, are visible to an observer looking through the windshield. Indeed, as light is transmitted through these new interfaces that have formed within the glass, extraneous refraction thereof occurs.

The damage to the windshield, conventionally categorized as a simple crack, a bull's-eye, a star, or a combination thereof, is typically small and confined to the outside glass layer. In the case of bull's-eyes, the fracture planes usually run parallel to the glass surface, sloping downwards. The presence of these fracture planes, which may cover a significant portion of the windshield, can be distracting to the driver and interfere with his line of vision. Furthermore, the presence of fractures, showing as cracks, constitute points of weakness within the outer glass pane. As is well known to those skilled in the art, such cracks are apt to propagate further, resulting in substantial interference with the driver's vision. Accordingly, to avoid a collision caused by such visual distractions and inhibited line of sight, expensive replacement of the windshield is required.

On the other hand, if this damaged glass could have been repaired prior to the propagation of the cracks, by filling the voids within the said damage whereby the fracture planes were properly bonded together, such conventional and costly replacement of the windshield could be avoided.

As is also well known in the prior art, through the use of resins which have refractive indexes substantially the same as that of glass, suitable viscosity, suitable adhesion to glass, and are non-yellowing, it is possible to repair damaged glass and accordingly extend a windshield's life.

Thus, if such resin is injected properly into the damaged glass by one skilled in the art, the interfaces hereinbefore described may be rendered invisible. If such a resin has been applied improperly, however, the damage will still be visible, showing voids, and, of course, have fracture planes that are not bonded together, thereby resulting in cracked glass which is apt to continue to fail.

It is well known to those skilled in the prior art, that filling voids in star damages is difficult, not only because the ends of the star are often far from the point of impact, but also because the passages between the fractured planes are narrow. This damage configuration tends to inhibit or even preclude the flow of a properly injected resin into the damage area.

An alternative method to repair such star damage is to drill holes at these points, to allow for the injection and consequent flow of resin into these locations. Capillary action will then pull the resin into the cracks until opposed by frictional forces. As is known to those skilled in the art, thinning the resin helps delay the affect of these frictional forces upon such capillary action, but this typically causes weak repairs. Accordingly, the repair is ephemeral and only cosmetic.

Many attempts have been made throughout the industry to develop methods and apparatus to enable resin to effectively and reliably penetrate into all voids contained in damaged windshields. Besides drilling holes in the outer glass pane to promote resin flow, the prior art teaches several methods of evacuating air from the damaged area, followed by injecting the resin into the voids, under pressure. Another method known to those skilled in the prior art involves cycles of evacuating and pressurizing.

As will become apparent, those skilled in the windshield repair art have attempted to overcome these and other difficulties associated with filling these voids in damaged windshields. For example, in U.S. Pat. No. 4,597,727, Birkhauser discloses a windshield repair kit which applies a vacuum followed by a pressure cycle to force resin into the voids constituting the damaged area. While the air-evacuation method taught by Birkhauser may be advantageous to repair some damages, it should be apparent that creating a vacuum for each repair is time-consuming and expensive.

It should be clear to those knowledgeable in the art that a repair method using external pressure to cause the penetration of resin into damaged areas, can be advantageous provided an equivalent force is applied on the exterior of the glass surface in an inwards direction against the curvature of the windshield. If this equilibrium is not achieved and maintained during the repair the widening of cracks and the like due to such pressure may cause further failure of the windshield.

In U.S. Pat. No. 3,562,366, Sohl discloses a method of repairing windshields which uses ultrasonic vibration to make the flow of resin into the voids possible.

Werner, in U.S. Pat. No. 3,993,520, discloses a pressure-method followed with vacuum cycles to promote flow of the resin if difficulties are encountered therewith. The Werner windshield repair apparatus consists of a bridge-like member interconnected with two suction cups, which attach to the glass surface. Leveling screws are used to provide support on the opposite side of the injection assembly, in order for it to be in contact with the glass.

When resin is added to the Werner apparatus, pressure is applied, which radiates in all directions. Sideways, the resin is trying to force its way between the seal and the glass surface. However, the same forces provide an uplift on the injection assembly, causing it to move away from the damage. This uplifting action is transmitted to the bridge-like member and suction cups, whereby the bridge is caused to be tilted because of the pivoting effect created where the bridge attaches to the top of the suction cups. As should be apparent, the seal will then become misaligned with the glass surface and the resin will then spill to the outside of the injector. Once this happens, of course, less resin is present in the injection chamber and the necessary pressure is difficult to re-establish.

Accordingly, it should be clear to those skilled in the art that Werner apparatus and method are limited to small damages primarily because it inherently fails to adhere to the glass surface. Thus, while this pressurized injection method has improved the windshield repair art, the problem of how to inexpensively and reliably sustain sufficient downward pressure to secure uninterrupted contact between the seal and the damage has heretofore been unsolved.

As is well known to those familiar with this injection method, filling resin with conventional droppers tends to cause the resin to travel down the inside wall of the injector barrel, thereby coating the threads thereof. Additionally, the vacuum created by unscrewing the injector pin is inadequate to provide the forces to enable trapped air to be expelled from the damage. Since the fracture planes engendered by the cone-shaped damage hereinbefore described are usually sloped relative to the glass surface, such release of the pressure imparted by the injector pin tends to cause air occasionally to float from the damage into the injector.

The pressurized repair techniques known to the prior art are thus limited to repairing relatively small damaged areas, typically in the range of one to one and one-half inches in diameter. As has been explained herein, the voids in windshield damage have narrow passages, and accordingly require high pressures to force resin therein. The repair devices known in the prior art have had limited success providing these prerequisite pressures.

Accordingly, these limitations and disadvantages of the prior art are overcome with the present invention, and improved repair means and techniques are provided which effectively and reliably repair damaged windshields.

SUMMARY OF THE INVENTION

In a preferred embodiment of the present invention, an apparatus for making in situ repairs with liquid resin to damage at or near the surface of shatterproof windshields is provided. More particularly, means is provided to conveniently and effectively attach to a windshield, a device within the concept of the present invention, whereby such a device is held to the surface and, using advantageous leveraged forces, promotes the resin penetrating cracks in the windshield and the like.

Referring now to the improved repair apparatus, it includes a plate disposed on the top portion of a preferably rectangular housing which supports a novel injector assembly and pressure assembly. The housing includes two pair of substantially vertical walls. The support plate is pivotally interconnected to the top of the housing by a pair of hinges, one disposed on each of its longitudinal sides.

The housing is secured to the surface of the windshield by the cooperative action of a membrane and handlebar commonly used to secure a pencil sharpener to a table surface. The vacuum created thereby is maintained by the solid housing structure.

The injector assembly is disposed perpendicularly of and axially through one of three threaded apertures which look like ears, and which are disposed on one end of the support plate. Adjustment screws which are disposed on the other end of the support plate control the pitch and elevation of the injector assembly with respect to the surface damage. These adjustments enable the prerequisite pressure to be maintained upon the resin contained in the injector barrel, which, of course, enables the resin to penetrate into the damaged portion of the windshield.

Thus, the preferred embodiment is firmly held to the glass surface, thereby enabling maximum pressure to be exerted upon the injector assembly. It is an important feature of the present invention that the holding power of the injector assembly derives from the leverage action provided by the support plate in cooperation with the hereinbefore described hinges. It is also a feature of the present invention that the preferred embodiment is easily made parallel to the damaged surface by manipulating the adjustment screws thereof.

The pressure assembly, disposed medially of the hinge connection and the plurality of ears, includes a guide pin and a pressure arm. The pressure arm is concentrically attached to the guide pin which is threadingly attached perpendicularly to the top of the support plate. To maintain pressure upon the injector assembly, the pressure-arm is rotated on top of the plunger contained in the injector barrel and then driven downwardly by tightening an adjustment knob thereon.

The preferred embodiment enables simple cracks to be repaired by inserting the plunger into the injector barrel and applying hand-pressure thereon. For star cracks and the like, however, the pressure assembly is invoked as hereinbefore described to provide greater pressure upon the seal-damage interface.

While the preferred embodiment may be applied on most portions of a windshield, an extension assembly is provided to accommodate portions of a windshield with substantial curvature or to portions thereof proximal to corners. This extension assembly includes a variable-length plate into which may be perpendicularly attached an injector assembly. Also included on the extension assembly is a suction cup to secure it to these adverse portions of the windshield. The adjustment screws contained on the plate portion of the housing may, of course, be adjusted to take advantage of the leveraged forces even on this remote assembly.

Accordingly, it is an object of the present invention to provide a windshield repair apparatus which may be installed with minimal effort on virtually any portion of the surface of a windshield.

It is still another object of this invention to provide a windshield repair apparatus which establishes a secure hold on virtually any portion of the surface of a windshield.

It is another object of the present invention to provide a windshield repair apparatus which may be accurately disposed parallel of the surface of a windshield.

It is yet another object of the present invention to provide a windshield repair apparatus with means to effectively position an injector assembly on virtually any portion of the surface of a windshield.

It is another object of the present invention to provide a windshield repair apparatus with means to provide constant and sufficient pressure on a resin-damage interface on virtually any portion of the surface of a windshield.

It is another object of the present invention to provide a windshield repair apparatus with means to apply and maintain sufficient pressure to the seal-damage interface whereby regular cracks of up to 2 ½ inches in radius, and star cracks of up to 1 ½ inches in radius, may be effectively repaired.

It is still another object of the present invention to provide a windshield repair apparatus with means to prolong the pressure applied to a seal-damage interface without a worker being present.

It is yet another object of the present invention to provide a windshield repair apparatus with means to enable a worker to repair more than one windshield contemporaneously.

It is a specific object of the present invention to provide an apparatus to make in situ repairs with liquid resin to damage at or proximal to the surface of a shatterproof windshield, comprising securing means for releasably attaching said apparatus to said windshield surface, an injector assembly for transporting said resin to said damage, a pressure assembly for regulating and maintaining the pressure exerted upon said resin, adapting means pivotally interconnecting said injector assembly and said pressure assembly with said securing means, housing means fixedly interconnecting said securing means and said adapting means, said adapting means having first support means disposed at one end portion thereof to receive said injector assembly, having second support means disposed medially thereof to receive said injector assembly, and having control means disposed at the other opposite end portion thereof to control the disposition of said injector assembly with respect to said damage, said securing means including a substantially flat membrane comprising the bottom portion of said housing means and adapted to engage said windshield surface by creating a vacuum within said housing means, said support means including a first plurality of receiving means in which said injector assembly is threadingly interconnected with one of said receiving means, said injector assembly disposed substantially perpendicularly of one of said first plurality of receiving means, and comprising a substantially cylindrical barrel disposed longitudinally of said injector assembly, and axially containing a plunger with a piston fixedly attached at one end of said plunger, said barrel including about a two percent gradual taper from its top portion to its bottom portion to urge said resin therethrough, and adapted to receive and transport said resin to said damage, said pressure assembly comprising a guide pin disposed perpendicularly of said support means, an arm means rotatably and concentrically interconnected with said guide pin, to enable said pressure assembly to cooperate with said injector assembly to maintain a substantially constant force upon said resin, and including adjusting means to regulate the pressure exerted upon said arm means, said housing means including two pair of corresponding rigid substantially vertical walls configured to form a substantially rectangular cross-section, said adapting means including an extension assembly slidably interconnected with said housing means for reaching damage disposed in portions of said windshield with substantial curvature or proximal to corners thereof, said extension means comprising a plate means and a corresponding channel means, with said plate means being slidably inserted into said channel means, said extension plate means including a second plurality of receiving means in which said injector assembly is threadily interconnected with one of said receiving means, and including suction cup means to releasably attach said extension assembly to said portions of said windshield with substantial curvature or proximal to corners thereof.

These and other objects and features of the present invention will become apparent from the following detailed description, wherein reference is made to the figures in the accompanying drawings.

IN THE DRAWINGS

DETAILED DESCRIPTION

Figure 1:
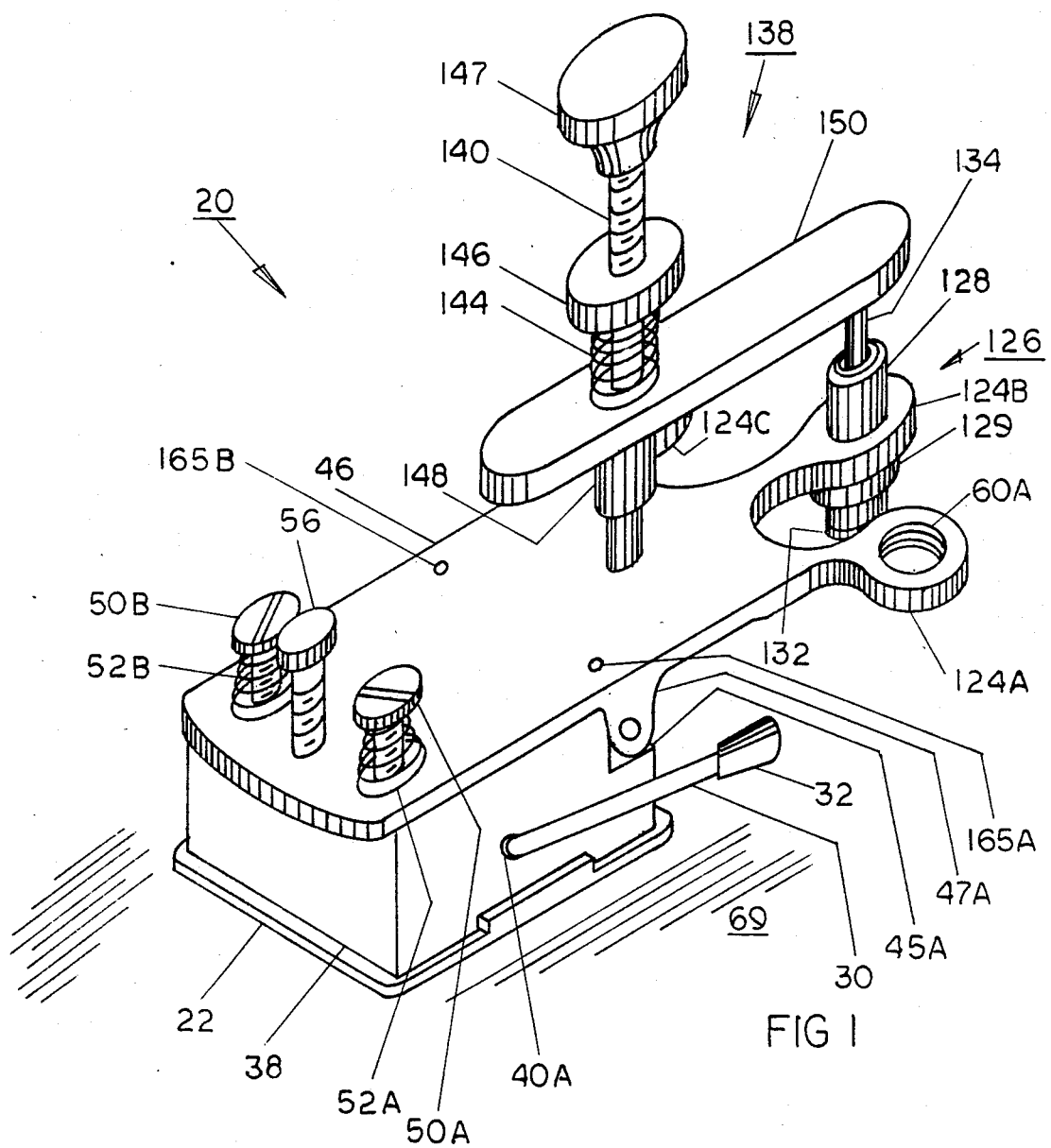
FIG. 1 is a perspective view of an apparatus embodying the concepts of the present invention.

Referring now to FIG. 1, there may be seen a perspective view of a windshield repair apparatus 20 embodying the concepts of the present invention. Support plate 46 supports injector assembly 126, pressure assembly 138, and adjusting screw 56, and is secured to housing 38 by two hold-down screws 50a and 50b, with springs 52a and 52b, respectively. Housing 38 may be constructed from die-cast aluminum and the like. Hold-down screws 50a and 50b, and adjusting screw 56 are supported on one end of plate 46, and injector assembly 126 is disposed perpendicularly of plate 46 on the other opposite end thereof. More particularly, injector assembly 126 is disposed perpendicularly of and axially through one of three threaded apertures 60a, 60b or 60c centrally disposed in ears 124a, 124b 124c, respectively. For example, as depicted in FIG. 1, injector assembly is screwed into aperture 60b contained within ear 124b until shoulder 129 is reached.

Figure 6:
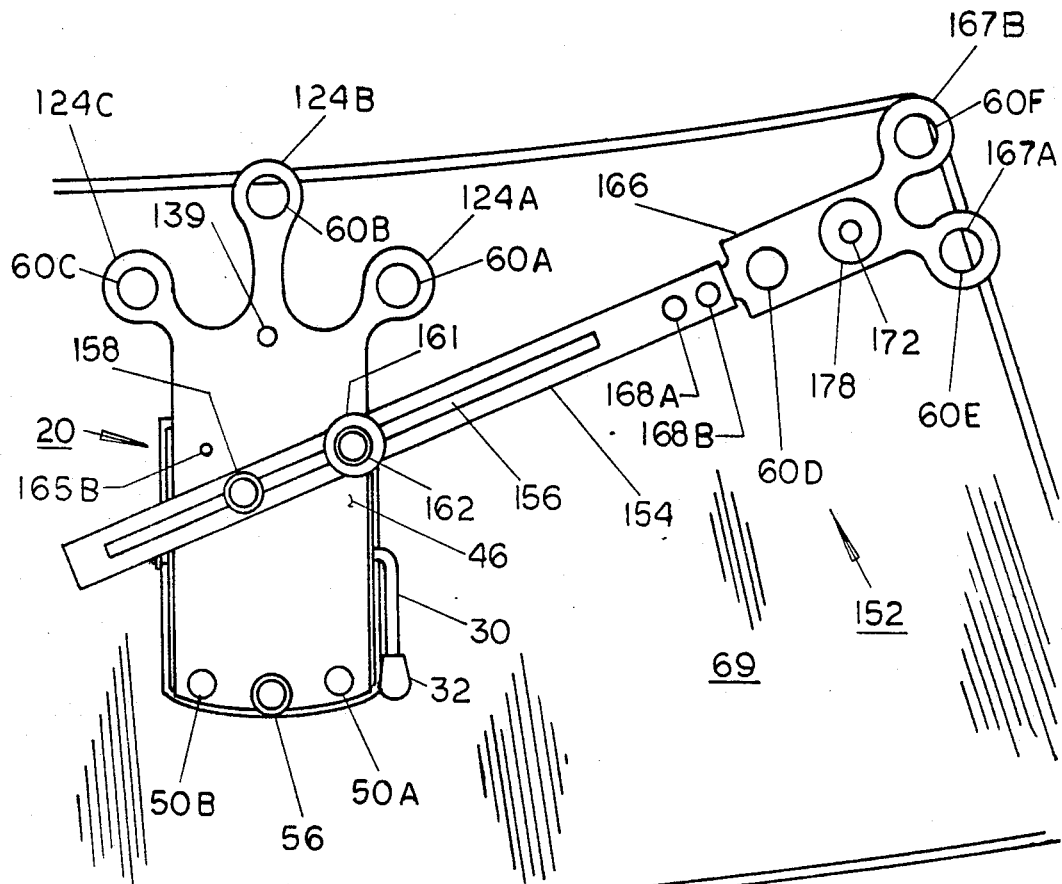
FIG. 6 is a top plan view of another apparatus embodying the concepts of the present invention.

Still referring to FIG. 1, guide pin 140 of pressure assembly 138 is perpendicularly and fixedly attached to plate 46 at threaded aperture 139 (depicted in FIG. 6). Adjusting knob 147 and nut 146 with spring 144, and guide 148 are rotatably and concentrically attached to guide pin 140. Pressure arm 150 is rotatably attached to guide pin 140 and disposed parallel to plate 46. Plunger 134, disposed axially inside injector barrel 128, is abutted on its top portion by pressure arm 150.

Figure 2:
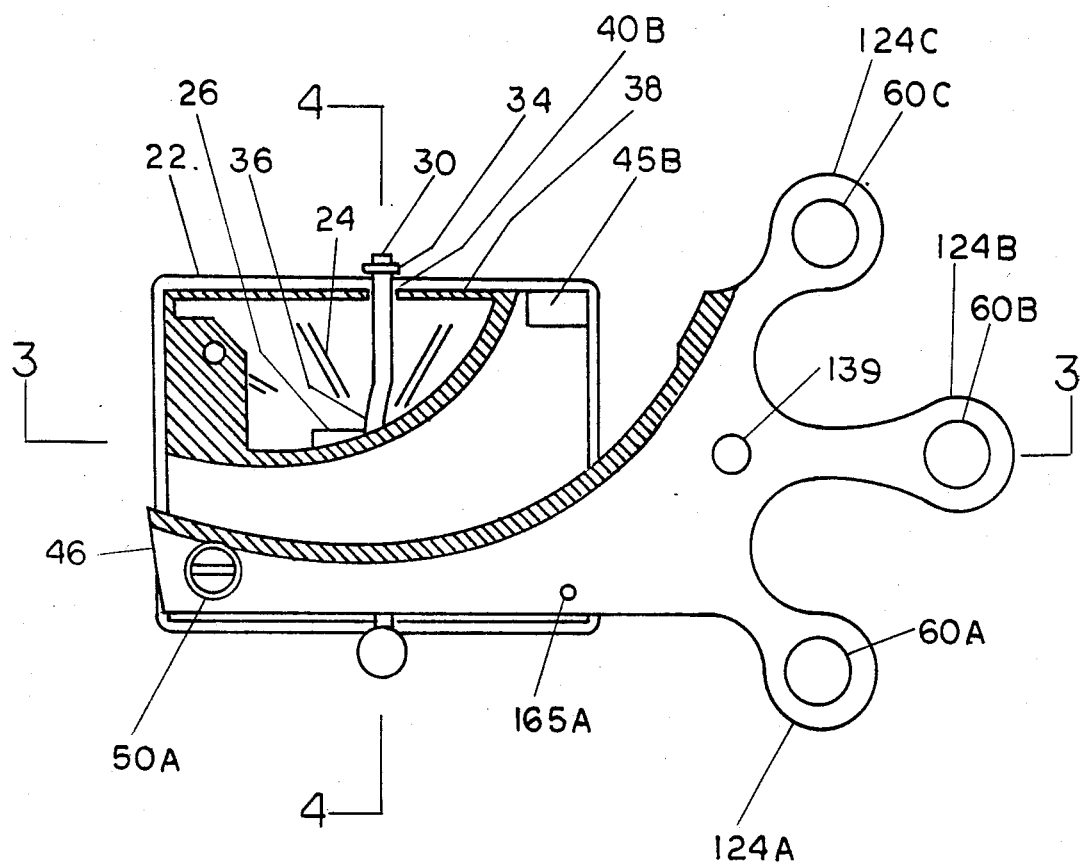
FIG. 2 is a top plan perspective view of the structures depicted in FIG. 1.

As is well known in the pencil sharpener art, membrane 22 and cylindrical handlebar 30 cooperate to releasably attach the windshield repair apparatus 20 to a glass surface and the like. As depicted in FIGS. 2, membrane 22 has ribs 24 on its interior surface to impart strength thereto. Now referring to FIGS. 3 and 4, clip 26 is molded into the top surface of membrane 22. Said clip 26 has elongated hole 28 (depicted in FIG. 3) in which handlebar 30 can slide longitudinally of plate 46. Said handlebar 30 has a protective cap 32 at on end, lock-washer 34 at the other end, and offset 36 where the handlebar passes through clip 26. Handlebar 30 is connected to housing 38 through two holes 40 disposed in its sides. Lock-washer 34 anchors said handlebar to housing 38. Said housing 38 has guide 42 for clip 26.

Figure 3:
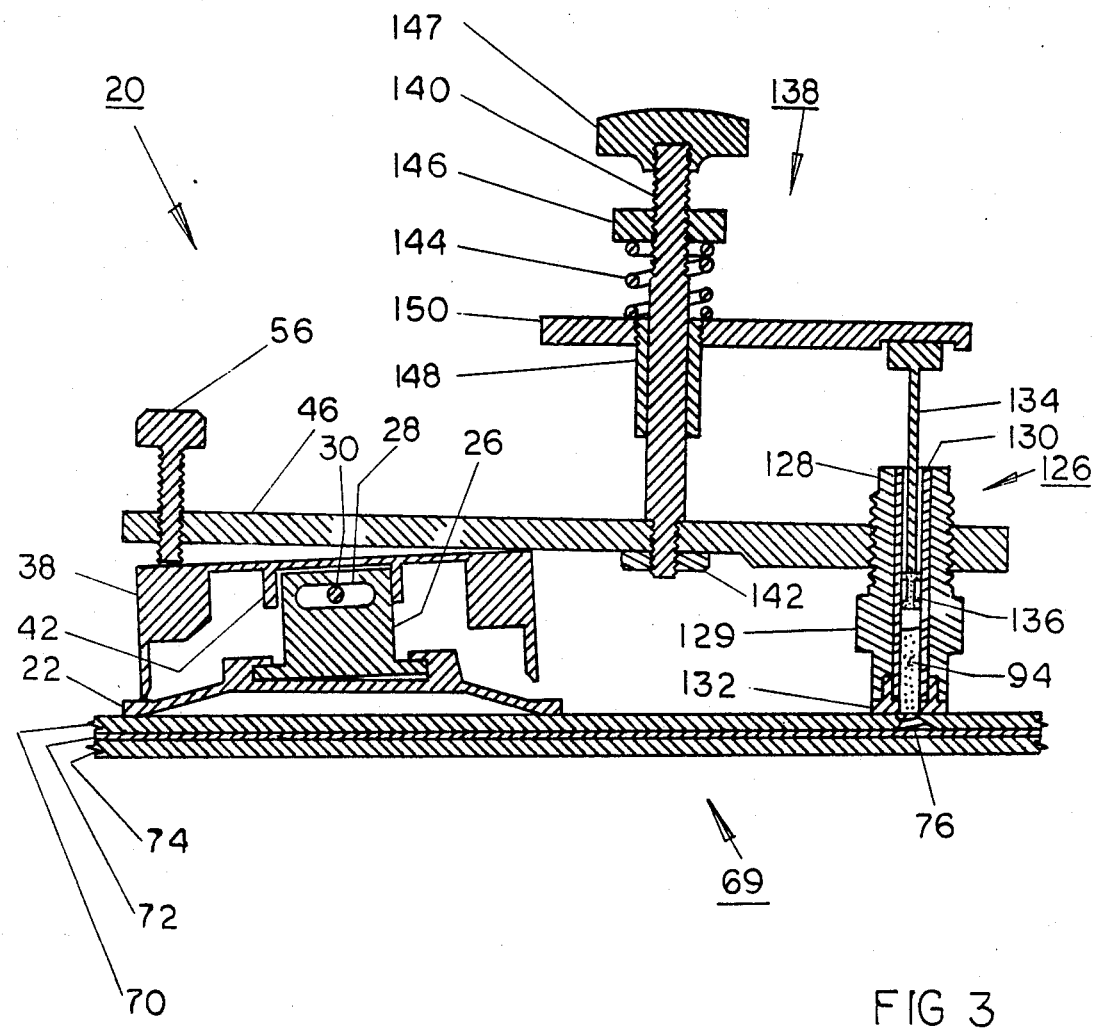
FIG. 3 is a cross-sectional view of the structures depicted in FIGS. 1 and 2, along longitudinal axis 3—3.
Figure 4:
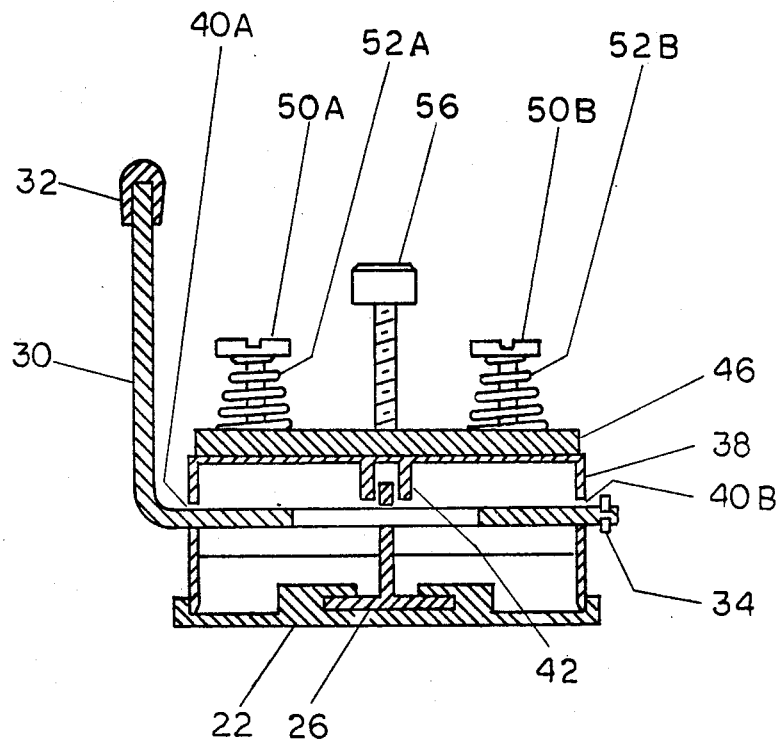
FIG. 4 is a cross-sectional view of the structures depicted in FIGS. 1 and 2, along transverse axis 4—4.

As depicted in FIG. 3, windshield repair apparatus 20 is placed upon the surface of windshield 69, with membrane 22 substantially parallel thereto and with the bottom portion of injector barrel 128 centered over cone 76. Cone 76 is the visible manifestation of damage to the outer glass layer 70 of windshield 69. Handlebar 30 is then rotated through a 180 degree arc whereby offset 36 causes a lifting of clip 26 which is communicated to membrane 22. This lifting action upon membrane 22 creates a vacuum holding housing 38 firmly against the adjacent surface of windshield 69. Accordingly, injector barrel 128 is fixedly held over cone 76.

Now referring to FIG. 1, support plate 46, which is mounted to the top of housing 38, is held in place with hinges 47a and 47b. Hinges 47a and 47b are bolted to housing 38 at recesses 45a and 45b (depicted in FIG. 2), respectively. Adjusting screw 56 enables housing 38 to be elevated from a disposition parallel to the surface of windshield 69, whereby injector assembly 126, disposed at the other opposite end of plate 46 from screw 56, is correspondingly tilted downwards by pivoting about an axis defined by hinges 45a–45b. Accordingly, annular seal 132, disposed on the bottom portion of injector barrel 128, securely circumscribes and abuts against the windshield surface encompassing cone 76.

It is an advantage of the present invention that the holding power of injector assembly 126 derives from the leverage action provided by plate 46 in cooperation with hinges 45a and 45b. Additionally, the structures of the present invention enable seal 132 to be conveniently disposed parallel to outer surface 70 of windshield 69. More particularly, when preferred embodiment 20 is placed on outer surface 70 as hereinbefore described in detail, the space created between the bottom edge of seal 132 and said surface may be used to visually guide the adjustments to screw 56 whereby seal 132 is rendered parallel to this surface. As has also been hereinbefore described, adjustment screw 56 may be further rotated to cause an increase in the pressure upon injector assembly 126, in turn, deflecting the pressured-glass at cone 76 toward the interface between outer layer 70 and plastic laminate 72, causing other damage, if any, in the vicinity of cone 76 to become visible. As is known to those skilled in the art, such ancillary damage often goes undetected, resulting in an incomplete repair and an unsatisfied customer.

Referring now to FIG. 3, there may be seen a longitudinal cross-sectional view of the windshield repair apparatus 20 depicted in FIGS. 1 and 2. Pressure assembly 138 is disposed perpendicularly of plate 46 and secured thereto through aperture 139 by lock nut 142. Guide 148 is disposed concentrically of guide pin 140 and is rotatably attached thereto. Pressure arm 150 is fixedly attached to guide 148. When pressure arm 150 is rotatably disposed concentrically upon piston 134, its position is secured by tightening nut 146 against the resistance provided by spring 144. By placing a palm of the hand upon knob 147, a worker may easily cause pressure arm 150 to be lifted notwithstanding the said resistance afforded by spring 144.

In accordance with the concepts of the present invention, pressure assembly 138 overcomes several problems associated with providing sufficient pressure to enable conventionally used acrylic, urethane and epoxy resins to thoroughly penetrate into a damaged area in the outer layer of a windshield. As should be apparent to those skilled in the art pressure arm 150 provides constant downward force upon piston 134, which is propagated to the interface of seal 132 and cone 76. Additionally, this pressure may be maintained for a prolonged period of time without a worker being present. This, of course, affords the opportunity for a worker to repair more than one windshield contemporaneously. It should be apparent that this method is superior to that commonly used in the prior art, whereby a worker typically rotates the conventional screw-type injector about ⅛ revolution about every 10 seconds to maintain pressure on the seal. It is also a feature of the preferred embodiment that the pressure upon the seal-cone interface may be gradually increased by rotating adjusting nut 146.

Still referring to FIG. 3, to repair cone 76, a small amount of resin 94, preferably about 0.2 cc or about 10–12 drops, is injected with a syringe or a dropper into sleeve 130 of injector barrel 128. Plunger 134 with piston 136 fixedly attached is then inserted into sleeve 130. To squeeze piston 136 as it travels down injector barrel 128, sleeve 130 is provided with a slight taper preferably about 2%. When the windshield damage is minimal, as is the case typically with bull's-eyes, repair thereto may be accomplished with the preferred embodiment by applying modest pressure only with plunger 134. On the other hand, when the damage is more severe, as is the case typically with star cracks, repair thereto requires additional pressure which is advantageously provided by pressure assembly 138. As hereinbefore described, pressure arm 150 is mounted with guide 148 concentrically upon guide pin 140. Tightening nut 146 compresses spring 144 which, in turn, exerts increased pressure upon resin 94. This pressure is maintained constant as resin 94 enters and penetrates the damage.

It should be apparent to those skilled in the windshield repair art that the preferred embodiment of the present invention overcomes the limited holding power provided by suction cups and the like. For example, increasing the pressure in a conventional repair apparatus consisting essentially of an injector traversing a bridge-like span supported by a pair of suction cups, tends to drive such suction cups away from the windshield surface. This, of course, destroys the integrity of the seal between the damage and the glass surface.

On the other hand, as hereinbefore described in detail, the preferred embodiment affords a holding power heretofore unknown to the prior art via the novel cooperation between membrane 22, handlebar 30, clip 26 and offset 36 to effect the creation of a vacuum between the bottom of membrane 22 and the surface 70 of windshield 69, and the maintenance thereof via the solid walls of housing 38. This holding power is advantageously reinforced by the stability and strength provided by pivotally modifying the disposition of injector assembly 126 with respect to the damage, by manipulating adjusting screw 56. Thus, the present invention provides a significant improvement in the holding power as well as in the application of pressure to damage over conventional windshield repair methods.

As is well known in the prior art, in situ repair of windshields has been limited to damage radii of no larger than 1 to 1.5 inches. Similarly, the windshield repair devices and techniques taught by the prior art have had only limited effectiveness in cases where the ends of a star crack are extremely narrow. The preferred embodiment of the present invention solves these limitations and disadvantages of the prior art by enabling the pressure applied to the seal-glass interface to be conveniently and effectively increased and sustained.

More particularly, in cases where increased pressure is required to accomplish a repair, screw 56 is adjusted so that plate 46 is leveraged about pivoting axis 45a-b causing increased pressure upon seal 132. As has been hereinbefore described in detail, pressure assembly 138 may also be invoked to increase the pressure still further. Moreover, the pressure upon seal 132 is maintained constant by the hereinbefore described cooperation between pressure arm 150 and plunger 134. As is conventional in the art, the pit left in the surface of the windshield, after the repair is completed may be filled with a fast-curing resin.

It is within the concept of the present invention to adapt the structures hereinbefore described in detail whereby repairs may be conveniently made to portions of a windshield with substantial curvature or to portions of a windshield proximal to corners. One such embodiment of the present invention is depicted in FIGS. 5 and 6.

Figure 5:
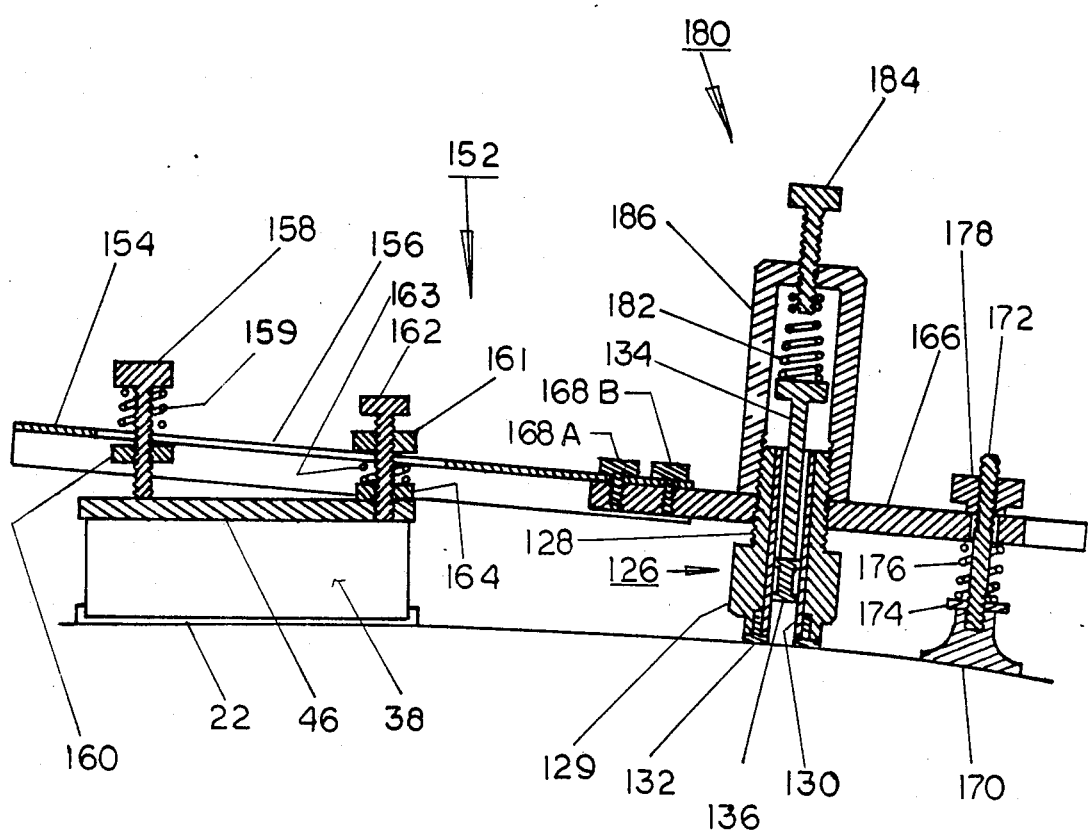
FIG. 5 is a perspective view in partial cross-section of another apparatus embodying the concepts of the present invention.

Specifically referring to FIG. 5, remote adapter assembly 152 is releasably attached to plate 46 with hold-down screw 162. A variable-length remote assembly 152 is achieved by the cooperation of extension plate 166 and channel 154 with slot 156. More particularly, the extension prerequisite to disposing injector assembly 126 over the damage as hereinbefore described in detail, is accomplished by sliding solid extension plate 166 into channel 156 and securing the length thereof by tightening screws 168a and 168b. Suction cup 170 is attached to extension plate 166 with stem 172 in conjunction with the combination of adjuster nut 178, spring 176 and washer 174.

When injector assembly 126 is properly positioned over the damage, suction cup 170 is pressed upon the surface of the windshield, screw 158 and nut 178 are simultaneously adjusted until seal 132 is disposed parallel to the damaged surface. Injector assembly 126 is then screwingly abutted against the surface below. Again invoking the unique leverage feature of the present invention, screw 158 and nut 161 may be simultaneously adjusted to provide the leverage necessary to exert the pressure required to force the resin into the damage. As should be clear to those skilled in the art, even more pressure may be exerted upon seal 132 by rotating adjusting nut 178, increasing the holding power of suction cup 170 upon the proximal glass surface therebelow.

Figure 7:
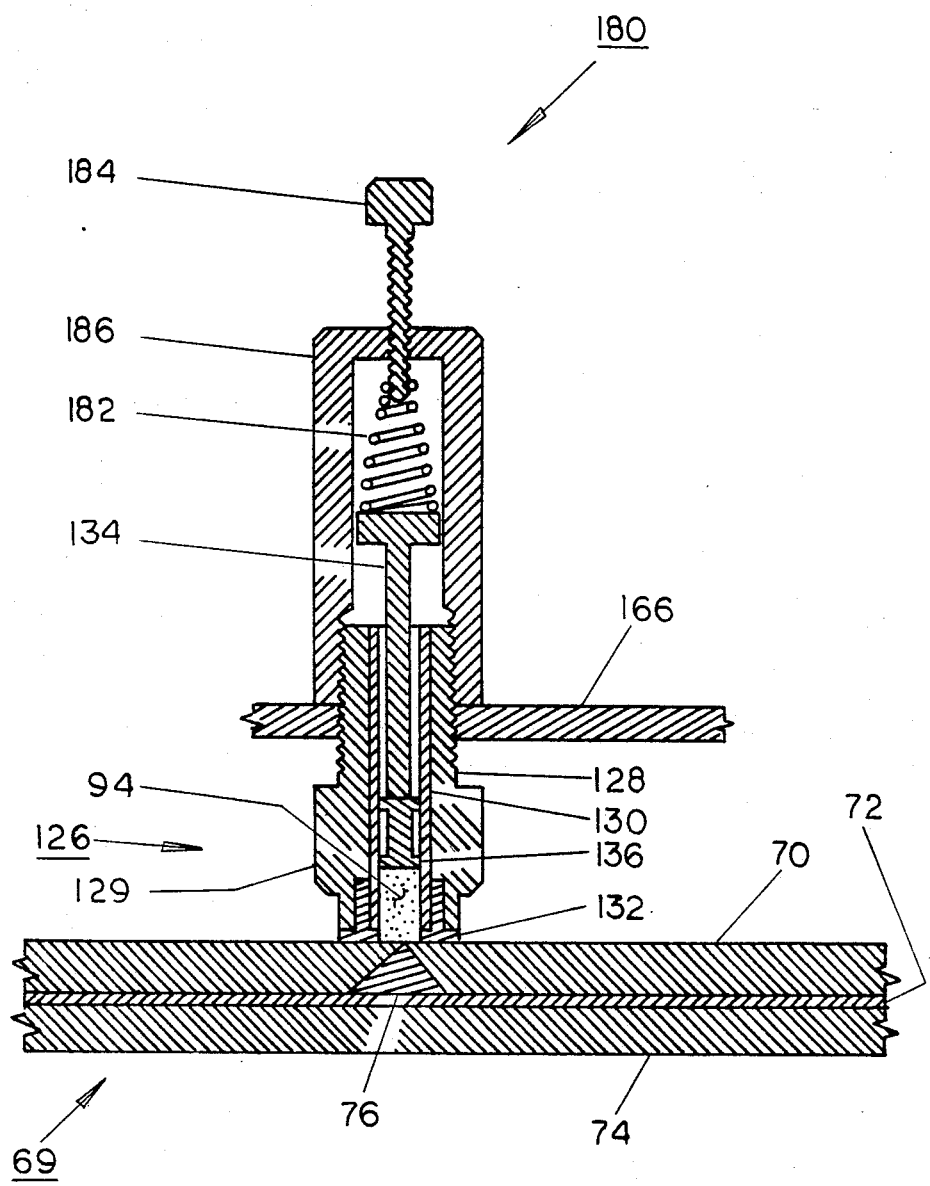
FIG. 7 is an enlarged sectional view of a portion of the structures depicted in FIG. 5.

Referring to FIGS. 5 and 7, there may be seen a modified pressure assembly 180 which is superimposed upon injector assembly 126. Dome 186 of pressure assembly 180 is preferably constructed of clear plastic material to enable spring 182 and plunger 134 to be seen. Constant pressure upon the resin may be conveniently provided by rotating adjuster screw 184.

FIG. 6 depicts a top planar view of the coordination of remote arm assembly 152 with the preferred embodiment of the windshield repair apparatus 20. Support bar 154 is attached to plate 46 by hold-down bolt 162 being secured to either of threaded aperture 165a or 165b. More particularly, as depicted in FIG. 1, apertures 165a and 165b are provided to enable remote assembly 152 to be attached to either longitudinal side portion of housing 38. This feature, of course, affords the maximum reach of embodiments of the present invention.

Plate 166 provides three locations, 60d, 60e or 60f at which to support injector assembly 126 perpendicularly thereof, as hereinbefore described in detail. Ears 167a and 167b are provided to enable repairs to be made to the remotest corners of the windshield and the like. Aperture 60e is centrally disposed within ear 167a and aperture 60f is centrally disposed within ear 167b. To repair damage remote from flat portions of the windshield but not necessarily in corners thereof, aperture 60d is provided on plate 166.

As should be clear to those skilled in the art, the advantageous features of the present invention significantly broadens the applicability of in situ windshield repair methodology. Indeed, embodiments of the present invention overcome the limitations of the prior art regarding the size and extent of windshield damage which may be repaired in situ. More particularly, the present invention affords the capability to repair regular cracks up to 2½ inches in radius, i.e., cracks up to 5 inches is diameter; and star cracks up to 1½ inches in radius, i.e., with a coverage of up to 3 inches.

Figure 8:
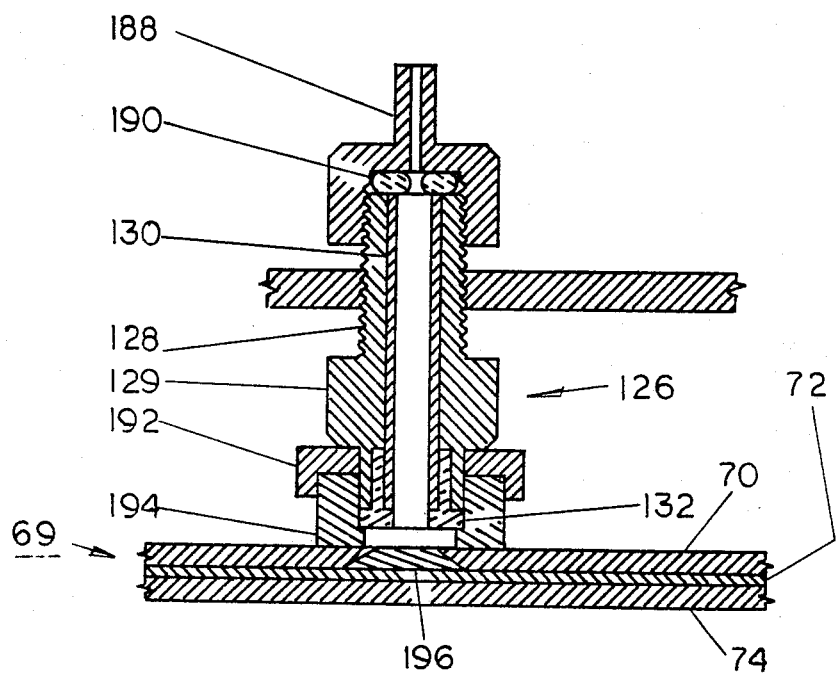
FIG. 8 is a cross-sectional view of another apparatus embodying the concepts of the present invention.

FIG. 8 depicts a cross-sectional view of a portion of an embodiment of the present invention adapted to repair a large surface damage 196. Rigid collar 192 and large diameter seal 194 are placed below shoulder 129 of injector barrel 128 to enable seal 132 to encompass damaged area 196 on the surface of glass layer 70. Also depicted is adapter fitting 188 and 0-ring 190 attached to injector assembly 126 to accommodate an external vacuum source and the like.

Other variations and modifications will, of course, become apparent from a consideration of the structures and techniques hereinbefore described and depicted. Accordingly, it should be clearly understood that the present invention is not intended to be limited by the particular structures and methods hereinbefore described and depicted in the accompanying drawings, but that the concept of the present invention is to be measured by the scope of the claims herein.

What is claimed is:

1. An apparatus to make in situ repairs with liquid resin to damage at or proximal to the surface of a shatterproof windshield, comprising:

securing means for releasably attaching said apparatus to said windshield surface, an injector assembly for transporting said resin to said damage, adapting means pivotally interconnecting said injector assembly with said securing means, housing means fixedly interconnecting said securing means and said adapting means, said adapting means having support means disposed at one end portion thereof to receive said injector assembly and having control means disposed at the other opposite end portion to control the disposition of said injector assembly with respect to said damage, and said securing means including a substantially flat membrane comprising the bottom portion of said housing means and adapted to engage said windshield surface by creating a vacuum within said housing means.

2. The apparatus described in claim 1, wherein said support means includes a first plurality of receiving means in which said injector assembly is threadingly interconnected with one of said receiving means.

3. The apparatus described in claim 2, wherein said injector assembly is disposed substantially perpendicularly of one of said first plurality of receiving means.

4. The apparatus described in claim 3, wherein said injector assembly comprises a substantially cylindrical barrel disposed longitudinally of said injector assembly, and axially containing a plunger with a piston fixedly attached at one end of said plunger.

5. The apparatus described in claim 4, wherein said barrel is adapted to receive and transport said resin to said damage by forcing said resin through said barrel.

6. The apparatus described in claim 5, wherein said barrel includes about a two percent gradual taper from its top portion to its bottom portion to urge said resin therethrough.

7. The apparatus described in claim 6, wherein said support means includes a pressure assembly threadingly interconnected therewith, said pressure assembly disposed between said plurality of receiving means and said control means.

8. The apparatus described in claim 7, wherein said pressure assembly comprises a guide pin disposed perpendicularly of said support means, an arm means rotatably and concentrically interconnected with said guide pin, to enable said pressure assembly to cooperate with said injector assembly to maintain a substantially constant force upon said resin.

9. The apparatus described in claim 8, wherein said pressure assembly includes adjusting means to regulate the pressure exerted upon said arm means.

10. The apparatus described in claim 9, wherein said housing means includes rigid substantially vertical walls.

11. The apparatus described in claim 10, wherein said adapting means includes an extension assembly slidably interconnected with said housing means for reaching damage disposed in portions of said windshield with substantial curvature or proximal to corners thereof.

12. The apparatus described in claim 11, wherein said extension means comprises a plate means and a corresponding channel means, with said plate means being slidably inserted into said channel means.

13. The apparatus described in claim 12, wherein said extension plate means includes a second plurality of receiving means in which said injector assembly is threadily interconnected with one of said receiving means.

14. The apparatus described in claim 13, wherein said extension plate means includes suction cup means to releasably attach said extension assembly to said portions of said windshield with substantial curvature or proximal to corners thereof.

15. An apparatus to make in situ repairs with liquid resin to damage at or proximal to the surface of a shatterproof windshield, comprising:
   securing means for releasably attaching said apparatus to said windshield surface,
   an injector assembly for transporting said resin to said damage,
   a pressure assembly for regulating and maintaining the pressure exerted upon said resin,
   adapting means pivotally interconnecting said injector assembly and said pressure assembly with said securing means,
   housing means fixedly interconnecting said securing means and said adapting means,
   said adapting means having first support means disposed at one end portion thereof to receive said injector assembly, having second support means disposed medially thereof to receive said pressure assembly, and having control means disposed at the other opposite end portion thereof to control the disposition of said injector assembly with respect to said damage, and
   said securing means including a substantially flat membrane comprising the bottom portion of said housing means and adapted to engage said windshield surface by creating a vacuum within said housing means.

16. The apparatus described in claim 15, wherein said support means includes a first plurality of receiving means in which said injector assembly is threadingly interconnected with one of said receiving means.

17. The apparatus described in claim 16, wherein said injector assembly is disposed substantially perpendicularly of one of said first plurality of receiving means.

18. The apparatus described in claim 17, wherein said injector assembly comprises a substantially cylindrical barrel disposed longitudinally of said injector assembly, and axially containing a plunger with a piston fixedly attached at one end of said plunger.

19. The apparatus described in claim 18, wherein said barrel is adapted to receive and transport said resin to said damage by forcing said resin through said barrel.

20. The apparatus described in claim 19, wherein said barrel includes about a two percent gradual taper from its top portion to its bottom portion to urge said resin therethrough.

21. The apparatus described in claim 20, wherein said pressure assembly comprises a guide pin disposed perpendicularly of said support means, an arm means rotatably and concentrically interconnected with said guide pin, to enable said pressure assembly to cooperate with said injector assembly to maintain a substantially constant force upon said resin.

22. The apparatus described in claim 21, wherein said pressure assembly includes adjusting means to regulate the pressure exerted upon said arm means.

23. The apparatus described in claim 22, wherein said housing means includes rigid substantially vertical walls.

24. The apparatus described in claim 23, wherein said adapting means includes an extension assembly slidably interconnected with said housing means for reaching damage disposed in portions of said windshield with substantial curvature or proximal to corners thereof.

25. The apparatus described in claim 24, wherein said extension means comprises a plate means and a corresponding channel means, with said plate means being slidably inserted into said channel means.

26. The apparatus described in claim 25, wherein said extension plate means includes a second plurality of receiving means in which said injector assembly is threadily interconnected with one of said receiving means.

27. The apparatus described in claim 26, wherein said extension plate means includes suction cup means to releasably attach said extension assembly to said portions of said windshield with substantial curvature or proximal to corners thereof.

28. An apparatus to make in situ repairs with liquid resin to damage at or proximal to the surface of a shatterproof windshield, comprising:

securing means for releasably attaching said apparatus to said windshield surface, an injector assembly for transporting said resin to said damage, a pressure assembly for regulating and maintaining the pressure exerted upon said resin, adapting means pivotally interconnecting said injector assembly and said pressure assembly with said securing means, housing means fixedly interconnecting said securing means and said adapting means, said adapting means having first support means disposed at one end portion thereof to receive said injector assembly, having second support means disposed medially thereof to receive said pressure assembly, and having control means disposed at the other opposite end portion thereof to control the disposition of said injector assembly with respect to said damage, said securing means including a substantially flat membrane comprising the bottom portion of said housing means and adapted to engage said windshield surface by creating a vacuum within said housing means, said support means including a first plurality of receiving means in which said injector assembly is threadingly interconnected with one of said receiving means, said injector assembly disposed substantially perpendicularly of one of said first plurality of receiving means, and comprising a substantially cylindrical barrel disposed longitudinally of said injector assembly, and axially containing a plunger with a piston fixedly attached at one end of said plunger, said barrel including about a two percent gradual taper from its top portion to its bottom portion to urge said resin therethrough, and adapted to receive and transport said resin to said damage, said pressure assembly comprising a guide pin disposed perpendicularly of said support means, an arm means rotatably and concentrically interconnected with said guide pin, to enable said pressure assembly to cooperate with said injector assembly to maintain a substantially constant force upon said resin, and including adjusting means to regulate the pressure exerted upon said arm means, said housing means including two pair of corresponding rigid substantially vertical walls configured to form a substantially rectangular cross-section, said adapting means including an extension assembly slidably interconnected with said housing means for reaching damage disposed in portions of said windshield with substantial curvature or proximal to corners thereof, said extension means comprising a plate means and a corresponding channel means, with said plate means being slidably inserted into said channel means, said extension plate means including a second plurality of receiving means in which said injector assembly is threadily interconnected with one of said receiving means, and including suction cup means to releasably attach said extension assembly to said portions of said windshield with substantial curvature or proximal to corners thereof.

* * * * *